C. G. CAPWELL.
RESILIENT WHEEL FOR VEHICLES.
APPLICATION FILED SEPT. 12, 1910.
998,953.
Patented July 25, 1911.
2 SHEETS—SHEET 1.
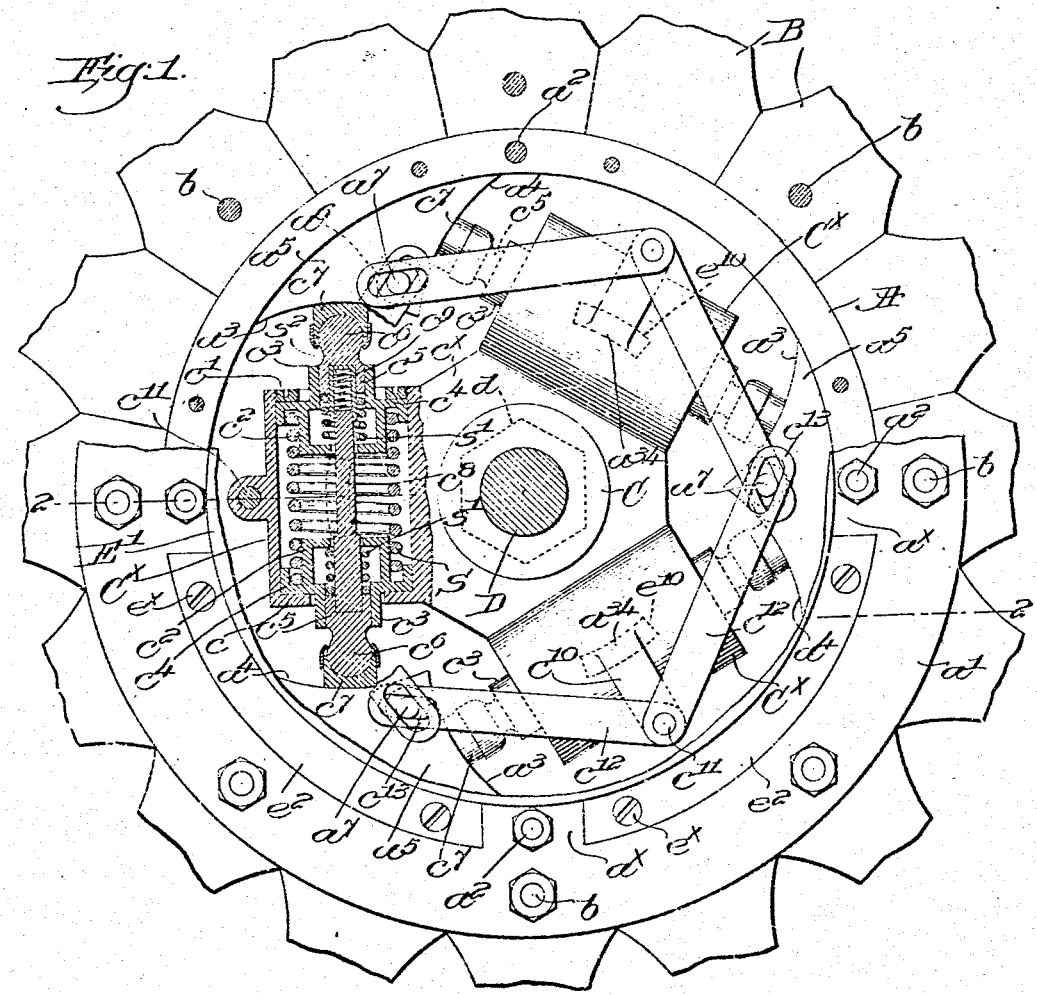

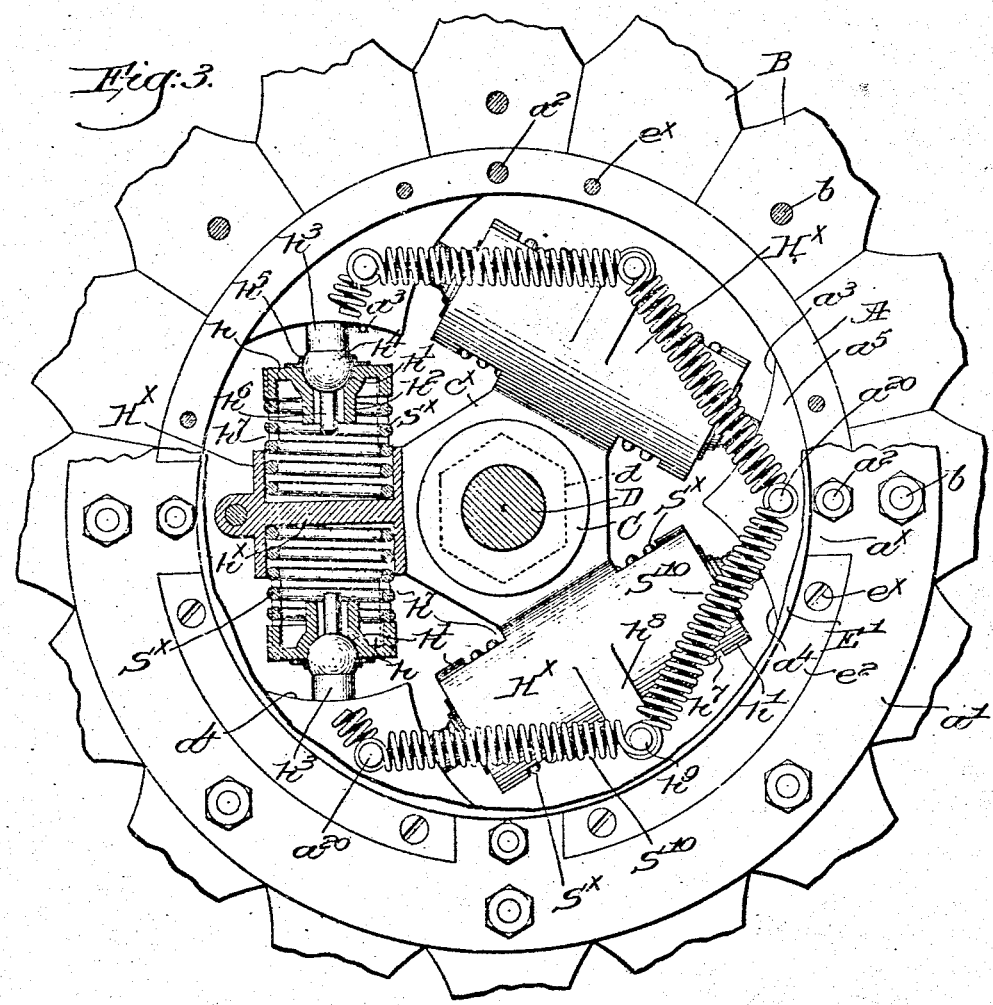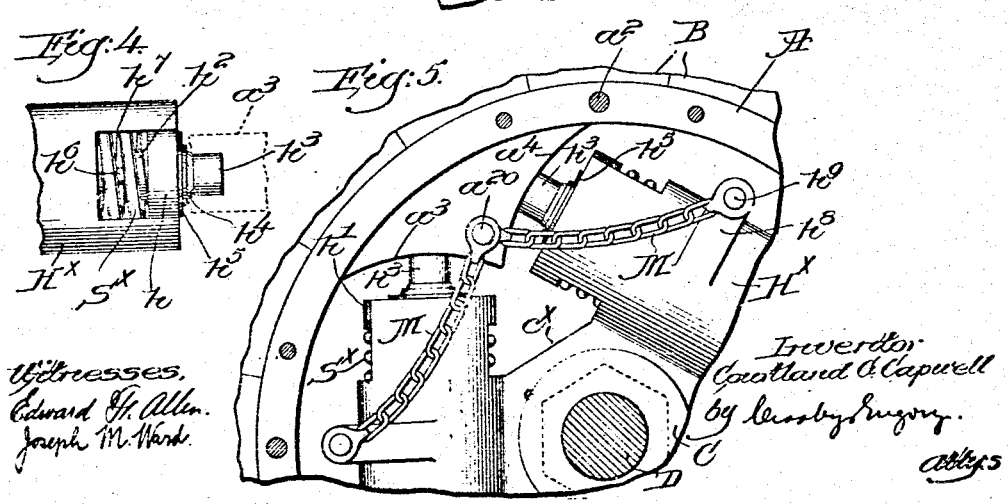

UNITED STATES PATENT OFFICE.

COURTLAND G. CAPWELL, OF ROSLINDALE, MASSACHUSETTS, ASSIGNOR OF THIRTY-SEVEN ONE-HUNDREDTHS TO FRED RAWITSER, OF SOUTH ACTON, MASSACHUSETTS, AND TWENTY-FIVE ONE-HUNDREDTHS TO JOHN H. MOORE, OF BOSTON, MASSACHUSETTS.

RESILIENT WHEEL FOR VEHICLES.

998,953.

Specification of Letters Patent. Patented July 25, 1911.

Application filed September 12, 1910. Serial No. 581,712.

*To all whom it may concern:*

Be it known that I, COURTLAND G. CAPWELL, a citizen of the United States, and resident of Roslindale, county of Suffolk, State of Massachusetts, have invented an Improvement in Resilient Wheels for Vehicles, of which the following description, in connection with the accompanying drawing, is a specification, like characters on the drawing representing like parts.

This invention relates to vehicle wheels of the type wherein the rim or felly is rigidly connected by spokes with an outer hub member which is yieldingly connected with an inner hub member always concentric with the axle, yielding connecting means between the two hub members permitting the wheel to yield under strain and by its resiliency obviating the use of cushion tires.

My invention has for its object the production of novel connecting and controlling means between the two hub members, whereby while the desired resilience of the wheel as a whole is attained the construction is simple, durable, and efficient.

The various novel features of my invention will be fully described in the subjoined specification and particularly pointed out in the following claims.

Figure 1 is an inner side elevation and partial section of a sufficient portion of a resilient wheel embodying my present invention, the inner cap plate being broken out centrally to show parts normally covered thereby; Fig. 2 is a transverse section on the line 2—2, Fig. 1, but with the axle and some of the adjacent parts shown in elevation; Fig. 3 is a view similar to Fig. 1, but showing certain modifications in details, to be referred to; Fig. 4 is a detail in side elevation of a part of the structure illustrated in Fig. 3, to be referred to; Fig. 5 is a detail view in side elevation of a modification to be referred to hereinafter.

Referring to Figs. 1 and 2 the annular outer hub member A, preferably made of metal, has an integral peripheral flange $a$ adjacent its outer flat face, and a removable flat ring $a'$ is adapted to be connected with the member A at its inner face by bolts $a^2$, which pass through ears $a^x$ on the inner circumference of said ring, four of such bolts being shown in Fig. 1.

The flange ring and interposed periphery of the member A form a channel in which are tightly fitted the butt ends of a series of longitudinally rigid spokes B, secured in any suitable manner at their outer ends to the wheel rim or felly (not shown). Herein I have shown bolts $b$ as passing through the butts of alternate spokes and through the ring $a'$ and flange $a$, to assist in retaining the butts of the spokes in place.

Upon the inner circumference of the hub member A I form a plurality of pairs of abutments $a^3$, $a^4$, having longitudinally, concaved faces, and the two abutments opposite each other constituting a pair are arcs of a circle struck from a common center indicated in Fig. 1 at $a^{34}$. The abutments are arranged symmetrically with relation to the center of the member A, and the part $a^5$ thereof between adjacent abutments $a^3$, $a^4$ has extended from its inner face a boss $a^6$ terminating in a stud $a^7$, the several bosses and studs being parallel to each other and to the axial center of the member A.

The inner hub member, to be described, is permanently concentric with the axle, and by means of yielding connecting and sustaining means between the inner and outer hub members the latter is free to assume eccentric positions with relation to the axle, as will be apparent hereinafter. Said inner hub member is made as a casting comprising a central hub portion C which receives and is keyed or otherwise fixed upon the axle D and held thereupon by a retaining nut $d$, the hub portion C having a lateral web $c^x$ provided with three symmetrical edges, upon each of which is cast a cylinder $C^x$.

By reference to Fig. 1 it will be seen that the several symmetrically arranged cylinders are so positioned that the longitudinal axis of each is at right angles to a radius of the inner hub member, and that each cylinder is interposed between an opposed pair of abutments $a^3$, $a^4$, but at some distance therefrom. The center point $a^{34}$ for each pair of abutments is at the intersection of the longitudinal axis of the interposed cylinder with the radius of the inner hub member which is at right angles to such axis.

In the construction shown in Figs. 1 and 2 each cylinder has a centrally apertured head $c$ at one end and a retaining ring $c'$ is screwed into the other end. Like plunger boxes $c^2$ are located within the cylinder, each box having a tubular extension $c^3$ projecting beyond the cylinder end, and a lateral, lipped flange $c^4$ which moves slidably within the cylinder, a strong spiral spring S being interposed between the flanges of the two boxes. The detachable ring $c'$ enables me to assemble the parts in the cylinder, and the spring S presses the boxes $c^2$ against the adjacent ends of the cylinder under normal conditions, while permitting a yielding movement of either box within the cylinder under certain conditions. A plunger $c^5$ is longitudinally slidable in each extension $c^3$ and its inward movement is resisted by a spring $s'$ within the box, as shown in Fig. 1, the outer end of the plunger being made ball-like at $c^6$ to fit into a socketed head $c^7$ having a convex end to press against the opposed abutment $a^3$ or $a^4$ as the case may be. That is, one plunger-head coöperates with an abutment $a^3$ while the opposite plunger-head of the same cylinder $C^x$ coöperates with the other abutment $a^4$ of the pair.

The springs $s'$ are preferably so wound or set that they are practically inert until the plungers, one or the other, are subjected to inward pressure due to a relative movement of the inner and outer hub members, and when a plunger is subjected to such pressure it will move inward against the resistance of its spring $s'$ to a greater or less degree, according to the amount of such pressure, which is transmitted through the adjacent abutment.

In order to at all times maintain the two plunger-heads of a pair yieldingly pressed against the coöperating abutments I attach fixedly to one plunger a central transmission rod $c^8$, which passes freely through holes in the plunger boxes $c^2$ and its other end slides in a sleeve $c^9$, Fig. 1, fixed in the opposite plunger, a relatively light spring $s^2$ in the sleeve acting upon the end of the rod. As will be apparent this spring will, by its expansive action, tend at all times to separate the two plungers and maintain their heads $c^7$ yieldingly in engagement with the opposed pair of abutments. This separating spring has no function in taking up or absorbing strains due to the operation of the wheel, for such strains are in the first instance taken up by either or both of the springs $s'$, and if the strain and pressure are great enough the spring S will be called into action. That is, the first working pressure, as it may be termed, will be taken by the spring $s'$ when its plunger is moved inward to compress such spring, and after a certain amount of compression is exerted the plunger and its box will be moved inward together against the action of the spring S. This arrangement effects a very complete and smooth distribution and equalization of the more or less sudden shocks and strains to which the parts of the wheel are subjected when in use, and makes the wheel as a whole very much more elastic and resilient.

The ball and socket connection between the plunger and its head serves to maintain the latter at all times with its acting surface squarely against the abutment, and prevents any rough movement, chatter, or binding when the head is caused to slide upon the abutment.

Each cylinder has a transverse saddle $c^{10}$ formed thereon, to provide a support for a pin $c^{11}$, on the inner end of which are pivotally connected two limiting links $c^{12}$, the free end of each link having a longitudinal slot $c^{13}$ to fit loosely over one of the studs $a^7$, heretofore referred to. The two links connected with a cylinder coöperate with the studs $a^7$ on the parts $a^5$ of the outer hub member A at the opposite ends of such cylinder, and the slot and pin connection between such studs and the pair of links permit the relative yielding movement between the inner and outer hub members while at the same time limiting the relative rotative movement of such members. The slots $c^{13}$ are of such length that the plungers of a given cylinder will always be maintained in such position that their heads will be in proper coöperation with the abutments.

The springs $s'$ may be termed the main or primary springs, while the spring S in each cylinder is an auxiliary or secondary spring, as it is not brought into action until the load carried by the wheel is increased beyond a certain limit determined by the stiffness of the main springs.

By reference to Fig. 1 it will be seen that in all angular positions of the wheel the load weight transmitted through the axle D will be sustained yieldingly by the coöperative action of at least two plungers and their abutments, and such weight will be transferred by such means to the outer hub member, and shocks or jars, due to changes in the load, or to inequalities in the ground traversed by the vehicle, will be taken up and distributed by the action of the springs.

There is always more or less relative sliding movement of the abutments and coöperating plunger-heads, but by making the abutments concaved the movements are smooth and unaccompanied by chattering or improper vibration, and there cannot be any jamming or wedging action.

As the axle and the inner hub member thereon is yieldingly sustained by the outer or spoke-carrying member the necessity for pneumatic or other cushion tires is obviated.

An outer cap plate E is held against the flat face of the member A by the bolts $a^2$, as shown in Fig. 2, and an inner cap plate E' has a flange $e'$ provided with out-turned segmental ears $e^2$ which rest against the inner face of the member A between the ears or extensions $a^x$ of the ring $a'$. Suitable screws $e^x$ serve to hold the inner cap plate in position.

To prevent improper relative axial movement of the inner and outer hub members I provide flat faced segmental ribs $e^{10}$, $e^{11}$ on the inner faces of the cap-plates, to coöperate with the flattened ends of the saddles $c^{10}$ on the cylinders.

Plate E is imperforate, but plate E' has an opening $e^3$ through which the axle D passes, and as said opening is considerably larger than the axle it is closed by a washer $e^4$ surrounding the axle inside the plate E'. Grease or other semi-solid lubricant can be filled into the chamber between the cap-plates, to thoroughly lubricate the moving parts between the inner and outer hub members.

In Fig. 3 I show the same construction for the outer hub member, the abutments, and cap-plates, and the inner hub member is of the same construction, in general, as shown in Figs. 1 and 2, but the cylinders are different, and the plungers are mounted therein and governed in a different manner from that heretofore described. Each cylinder $H^x$ is open at both ends, and has a transverse central partition, $h^x$, which serves as a support for strong spiral springs $S^x$, the free outer end of each spring sustaining a circular head $h$ slidable in the cylinder and having a semi-spherical socket $h'$ and an inwardly projecting tubular boss $h^2$, Figs. 3 and 4. A plunger $h^3$ has a ball-like inner end $h^4$ seated in the socket, the plunger coöperating with one of the abutments $a^3$, $a^4$, as before described, a retaining plate $h^5$ holding the plunger in its socket. While each plunger is held by its spring yieldingly against the opposed abutment the ball and socket construction enables the plunger to always maintain its proper relation to the abutment, the rocking movement of the plunger in the socket $h'$ being limited by a pin $h^6$ extending from the ball loosely into the tubular boss $h^2$ as will be apparent. Inasmuch as the cylinder ends approach quite closely to the opposed pair of abutments I cut the cylinder wall inward from each end, on the inner and outer portions, as at $h^7$, to form clearances which prevent any possibility of the cylinder striking an abutment when an extreme relative movement of the inner and outer hub members takes place. Each cylinder has a saddle $h^8$ which sustains a pin $h^9$, to the inner end of which are attached the ends of two strong spiral springs $S^{10}$, the outer ends of the springs being attached to studs $a^{xx}$ on the portions $a^5$ of the hub member A. These springs act as limiting means between the inner and outer hub members, when one is rotated relatively to the other, and thus correspond in function to the pairs of links $c^{12}$ shown in Figs. 1 and 2.

Obviously the modified structure illustrated in Figs. 3 and 4 operates in general as does the structure shown in Figs. 1 and 2, but while the modified form is simpler it is not quite so elastic or resilient as a whole, for the strains must be taken up wholly by the springs $S^x$. This arrangement, however, is well adapted for use with very heavy vehicles, where the permanent load on the wheels is large and the changing load does not cause any very material variation in the weight, or it could be used with good effect on trucks or other vehicles primarily designed for the transportation of freight.

The construction illustrated in Fig. 5 differs from that shown in Figs. 3 and 4 only in the fact that I use normally slack chains M to limit relative rotative movement of the inner and outer hub members of the wheel, the length of a chain when extended or taut determining the extent of such relative movement.

Various changes or modifications in details of construction and arrangement may be made by those skilled in the art without departing from the spirit and scope of my invention as set forth in the claims annexed hereto.

Having fully described my invention, what I claim as new and desire to secure by Letters Patent is:—

1. The combination, with inner and outer hub members, the latter loosely surrounding the former and having attached spokes, and symmetrically disposed, concaved abutments on the inner circumference of the outer member, of a plurality of cylinders mounted on the inner hub member, each cylinder being interposed between an oppositely located pair of abutments, and spring-controlled plungers carried by and longitudinally movable in each cylinder and held in yielding engagement with the corresponding pair of abutments, the end of each plunger contacting with an abutment being convexed and corresponding to the curvature of the abutment.

2. The combination, with inner and outer hub members, the latter loosely surrounding the former and having attached spokes, and symmetrically disposed, concaved abutments on the inner circumference of the outer member, of a plurality of cylinders mounted on the inner hub member, each cylinder being interposed between an oppositely located pair of abutments, a pair of spring-controlled plungers carried by and movable longitudinally in each cylinder and held in yielding engagement with the corresponding pair of opposite abutments, and means whereby the contacting portion of each plunger can tip to maintain a constant relation to its coöperating abutment.

3. The combination, with inner and outer hub members, the latter loosely surrounding the former and having attached spokes, and symmetrically disposed, concaved abutments on the inner circumference of the outer member, of a plurality of cylinders mounted on the inner hub member, each cylinder being interposed between an oppositely located pair of abutments, a pair of spring-controlled plunger-sustaining members carried by and longitudinally movable in each cylinder, a plunger mounted on each of said members and held in yielding engagement with the adjacent one of the oppositely located abutments of a pair, and means whereby the abutment-engaging portion of each plunger can accommodate itself to the face of the abutment during relative movement of the inner and outer hub members.

4. The combination, with inner and outer hub members, the latter loosely surrounding the former and having attached spokes, and symmetrically disposed, concaved abutments on the inner circumference of the outer member, of a plurality of cylinders mounted on the inner hub member, each cylinder being interposed between an oppositely located pair of abutments, a pair of spring-controlled plunger-sustaining members carried by and longitudinally movable in each cylinder, a plunger mounted on each of said members and held in yielding engagement with the adjacent one of the oppositely located abutments of a pair, and longitudinally extensible means connecting and limiting relative rotative movement of said hub members.

5. The combination, with inner and outer hub members, the latter loosely surrounding the former and having attached spokes, and symmetrically disposed, concaved abutments on the inner circumference of the outer member, of a plurality of cylinders mounted on the inner hub member, each cylinder being interposed between an oppositely located pair of abutments, spring-controlled plungers carried by and longitudinally movable in each cylinder and held in yielding engagement with the corresponding pair of abutments, and a pair of divergent limiting members connected at their adjacent ends with each cylinder and at their outer ends connected with the outer hub member, to limit relative rotative movement of the hub members.

6. The combination, with an inner hub member always concentric with the axle, a plurality of symmetrically disposed cylinders carried by said member, a pair of oppositely extended plungers longitudinally movable in each cylinder and having convex outer extremities, and springs to yieldingly sustain and resist inward movement of the plungers, of a loosely surrounding, annular hub member having on its inner circumference concave abutments arranged in opposite pairs to receive between them a cylinder and to engage the convex extremities of the plungers of such cylinder, the curved faces of each pair of abutments having a common center.

7. The combination, with an inner hub member always concentric with the axle, a plurality of symmetrically disposed cylinders carried by said members, a pair of oppositely extended plungers longitudinally movable in each cylinder and having convex outer extremities, and springs to yieldingly sustain and resist inward movement of the plungers, of a loosely surrounding, annular hub member having on its inner circumference concave abutments arranged in opposite pairs to receive between them a cylinder and to engage the convex extremities of the plungers of such cylinder, and a pair of divergent limiting members attached at their adjacent ends to each cylinder and connected at their outer ends to the annular hub member adjacent the abutments between which the cylinder is located, to restrict relative rotative movement of the hub members.

8. The combination, with an inner hub member concentric with the axle, a plurality of symmetrically disposed cylinders carried by said member with their longitudinal axes at right angles to radii of the hub member, and spring-sustained plungers extended at opposite sides of the cylinders, of a loosely surrounding annular outer hub member, longitudinally concaved abutments on the inner circumference thereof arranged in opposite pairs to be engaged by the plungers of a cylinder interposed between them, to yieldingly connect the hub members, and longitudinally-rigid spokes carried by the outer member, the concave faces of each pair of abutments having a common center located on the radius of the inner hub member which passes through the center of the interposed cylinder.

9. The combination with an inner hub member always concentric with the axle, a loosely surrounding outer hub member, and means to limit relative rotative movement of said members, of pairs of longitudinally concave, oppositely located abutments on the interior of the outer hub member, pairs of oppositely extended plungers carried by the inner member, each pair of plungers engaging and coöperating with a pair of opposed abutments, and primary and secondary springs to coöperate successively with each plunger and resist inward movement thereof when the load is increased.

10. The combination with an inner hub member always concentric with the axle, a loosely surrounding outer hub member, and means to limit relative rotative movement of said members, of pairs of longitudinally concave, oppositely located abutments on the interior of the outer hub member, a plurality of symmetrically disposed cylinders carried by the inner hub member, each cylinder being interposed between a pair of opposite abutments, plunger-boxes longitudinally slidable in the opposite ends of each cylinder, a secondary spring interposed between and normally preventing inward movement of said boxes, a plunger slidable in each box and having its outer end in engagement with the adjacent abutment, and a primary spring in each box and coöperating with the plunger therein to resist inward movement of the plunger, the primary and secondary springs acting successively when the load is increased beyond the resistance of the primary springs.

11. The combination with an inner hub member always concentric with the axle, a loosely surrounding outer hub member, and means to limit relative rotative movement of said members, of pairs of longitudinally concave, oppositely located abutments on the interior of the outer hub member, a plurality of symmetrically disposed cylinders carried by the inner hub member, each cylinder being interposed between a pair of opposite abutments, plunger-boxes longitudinally slidable in the opposite ends of each cylinder, a secondary spring interposed between and normally preventing inward movement of said boxes, a plunger slidable in each box and having its outer end in engagement with the adjacent abutment, a primary spring coöperating with each plunger to resist inward movement thereof relatively to its box, the secondary spring acting to resist inward movement of the plungers when the load is increased beyond the resistance of the primary springs, and separate means to maintain each pair of plungers at all times in yielding engagement with the coöperating pair of abutments.

12. The combination with an inner hub member always concentric with the axle, a loosely surrounding outer hub member, and means to limit relative rotative movement of said members, of pairs of longitudinally concave, oppositely located abutments on the interior of the outer hub member, a plurality of symmetrically disposed cylinders carried by the inner hub member, each cylinder being interposed between a pair of opposite abutments, a pair of plungers projecting from opposite ends of each cylinder, means to maintain the plungers in yielding engagement with the opposed pair of abutments, a primary spring to coöperate with and resist inward movement of each plunger when subjected to a predetermined pressure, and a secondary spring interposed between each pair of plungers and yielding to inward movement thereof only when said plungers are subjected to pressure beyond the resistance of the primary springs.

13. The combination with an inner hub member always concentric with the axle, a loosely surrounding outer hub member, and means to limit relative rotative movement of said members, of pairs of longitudinally concave, oppositely located abutments on the interior of the outer hub member, a plurality of symmetrically disposed cylinders carried by the inner hub member, each cylinder being interposed between a pair of opposite abutments, a pair of plungers projecting from opposite ends of each cylinder, means to maintain the plungers in yielding engagement with the opposed pair of abutments, a support for each plunger, slidable longitudinally in the cylinder, each plunger being also slidable in its support, a heavy secondary spring interposed between the supports and normally holding them against inward movement, and a primary spring interposed between each support and its plunger, the primary springs yielding when the plungers are subjected to a predetermined pressure through the coöperating abutments.

In testimony whereof, I have signed my name to this specification in the presence of two subscribing witnesses.

COURTLAND G. CAPWELL.

Witnesses:
 LEONA CHANDLER,
 THOMAS J. DRUMMOND.